United States Patent [19]

Rowland

[11] Patent Number: 4,519,018

[45] Date of Patent: May 21, 1985

[54] CAR DOME LIGHT WITH ACCESSORY

[76] Inventor: David B. Rowland, 8713 Langtree La., Raleigh, N.C. 27612

[21] Appl. No.: 596,241

[22] Filed: Apr. 2, 1984

[51] Int. Cl.³ .............................................. B60Q 3/02
[52] U.S. Cl. ...................................... 362/74; 362/280; 362/323; 362/359; 362/361; 362/449
[58] Field of Search ................. 362/80, 280, 282, 303, 362/322, 323, 74, 359, 361, 449

[56] References Cited

U.S. PATENT DOCUMENTS

| 2,075,364 | 3/1937 | Smith | 362/226 |
|---|---|---|---|
| 3,109,598 | 11/1963 | Morgan | 362/226 |
| 3,130,921 | 4/1964 | Morgan | 362/226 |
| 3,443,083 | 5/1969 | Curran | 362/226 |
| 3,829,681 | 8/1974 | Fuss | 362/319 |
| 4,074,123 | 2/1978 | Wissinger | 362/319 |
| 4,443,834 | 4/1984 | Shafer et al. | 362/303 X |

Primary Examiner—Peter A. Nelson
Attorney, Agent, or Firm—William C. Lawton

[57] ABSTRACT

An automobile dome light accessory adapted to slide under the outer edge thereof and extend downwardly therefrom and around the dome light a sufficient distance that the light can be left on for use of a front or back seat passenger without adversely affecting the driver's vision during night driving. The accessory of this invention is a removable accessory that can be transfered between vehicles.

1 Claim, 10 Drawing Figures

CAR DOME LIGHT WITH ACCESSORY

BACKGROUND OF THE INVENTION

In today's mobile, traveling society, there is a continuing need for development of automotive accessories that facilitate travel and accommodate needs of travelers. It is within this perspective and to meet this need that the present invention was developed. The invention herein was developed to enable front and rear passengers of all cars (or small trucks) to use the car or truck dome light at night without impairing the vision of the driver.

Many of the more expensive cars on today's market are equipped with special reading lights located below window level or on extender cables allowing light in the passenger compartment without interference with the driver. But to the knowledge of the inventor herein, there has been no general accessory developed that is adaptable to direct light from a standard dome light to the passenger compartment without interference with the night vision of the driver.

The present invention is a low-cost device which can be engaged between the top of the dome light and the roof of almost any vehicle. When so held in place, the device can be turned to direct the dome lighting to the front passenger or back section of the car. The accessory detailed herein keeps the dome light from interfering with the rear-view mirror. It does not create a glare on the windshield that interferes with forward vision of the driver. When so in place, the night-time family trip in most any car can be used to the comfort and advantage of every passenger without interfering with the driver. The advantages of the expensive vehicle can be provided in the most economic of vehicles.

DETAILED DESCRIPTION OF THE DRAWINGS

The present invention provides a means for use of an automobile dome light during night driving for maximus use of the pasengers in the vehicle without impairing the night vision of the driver. It is particularly suitable for use by backseat passengers to provide light, for example, for younger passengers to play or read without inteference with the driver.

Figure 1A:
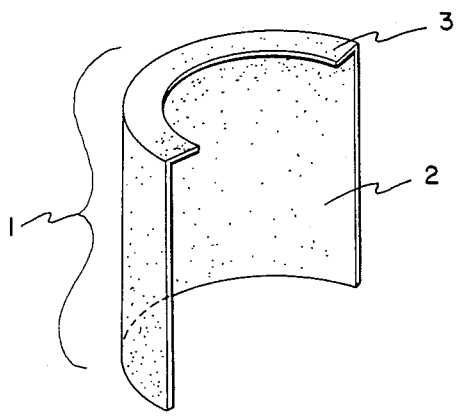
FIG. 1A is a three-dimensional view of an embodiment showing a dome light shield of the present invention circular in general shape.
Figure 1B:
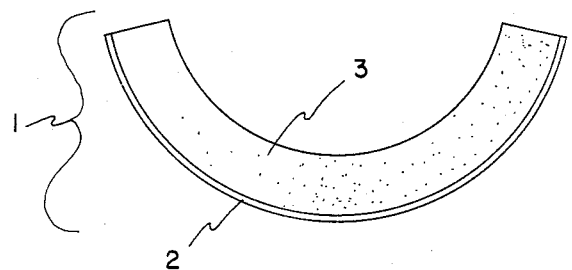
FIG. 1B is a bottom view of FIG. 1A.

FIG. 1 represents probably one of the simplest embodiments of the present invention. The dome light accessory is formed from almost any shape-sustaining material. Flexible rubber-like materials are suitable, but rigid plastic materials are most practical since such materials are cheaper than most metals and easier to form than metals or most flexible synthetic rubber-like materials. Should a flexible rubber-like material be used to form the surface of the accessory to shield the light, numeral 2, then the flange portions should most likely be formed from a more rigid material such as metal or rigid plastic.

Generally, the device of FIG. 1 is a dome light accessory, numeral 1, constructed of a surface of shape-sustaining material, numeral 2, extending in a substantially vertical plane continuously around the central axis, numeral 5, of a dome light. See FIGS. 5 and 6 for the location of the accessory of the present invention with respect to said axis. The vertical surface is preferably substantially parallel to said axis, but an absolute parallel relationship is certainly not necessary nor required by the present invention. The outermost vertical edges of the accessory preferably form an angle, designated α in the drawings, with said central axis of at least approximately 90°. The need for such a minimum angle is to provide a sufficient shield for the vehicle driver from the vehicle dome light when the light is on at night.

Figure 2A:
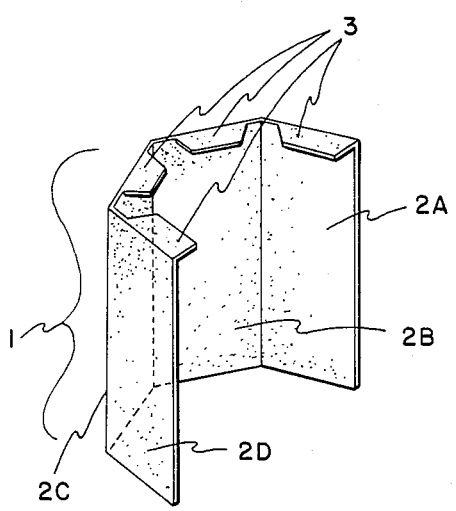
FIG. 2A is a three-dimensional view of an embodiment showing a dome light shield of the present invention consisting of four flat surfaces continuously joined.
Figure 2B:
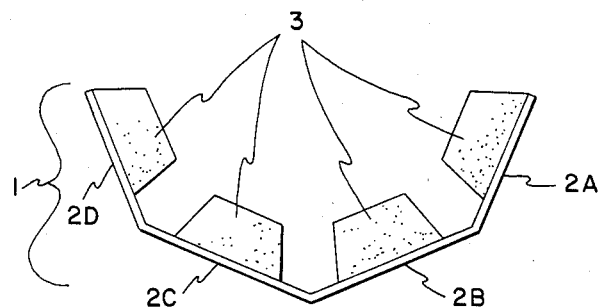
FIG. 2B is a bottom view of FIG. 2A.
Figure 3A:
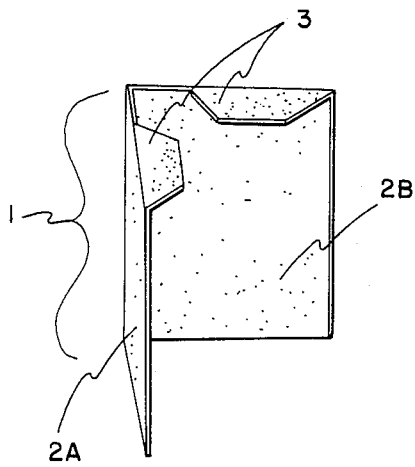
FIG. 3A is a three-dimensional view of an embodiment showing a dome light shield of the present invention consisting of two flat surfaces continuously joined.
Figure 3B:
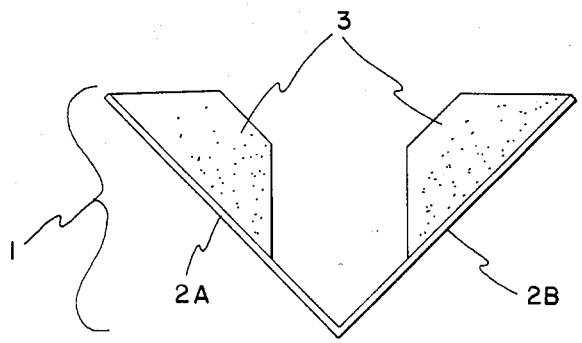
FIG. 3B is a bottom view of FIG. 3A.

The accessory, numeral 1, is held in place at the dome light by a continuous inward extending flange portion at the uppermost edge of said surface, numeral 3 in FIGS. 1, 4, 5 and 6; or by a series of such flange portions as shown in FIGS. 2 and 3 by numerals 3. The flange portions extend a distance inwardly toward said central axis. They slide between the dome light and the car roof. The screws holding the dome light in the roof are screwed tightly down to hold the accessory in place.

Figure 4:
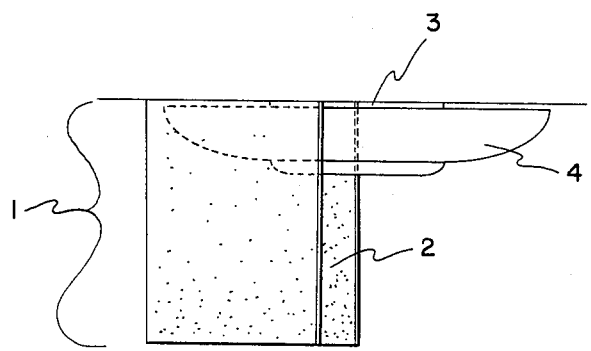
FIG. 4 is a three-dimensional view of the dome light accessory of the present invention in place between the top of a dome light and the top of a car.
Figure 5:
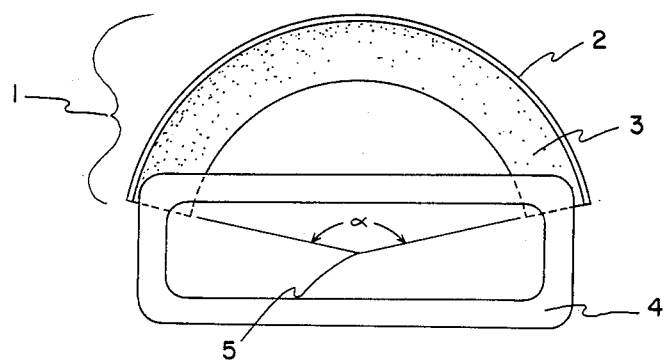
FIGS. 5 and 6 are bottom views of dome light accessories of the present invention in place with respect to two of the most common shaped automobile dome lights.
Figure 6:
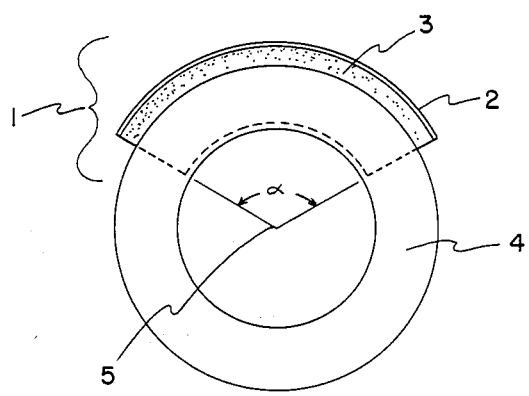

FIGS. 4, 5 and 6 show the accessory of this invention, numeral 1, held in place around automobile dome lights, numeral 4.

The embodiments of the present invention shown in FIGS. 2 and 3 differ from FIG. 1 in that the surface, numeral 2, is formed from a series of substantially flat surfaces, numerals 2A through 2D in FIG. 2, and numerals 2A and 2B in FIG. 3. The shape or design of the surface, numeral 2, is purely one of design choice and a matter of aesthetics. Obviously, a corrugated surface, or one where the lower edge is scalloped would clearly accomplish the purpose of this invention. Thus, the scope of the invention is not intended to be in any way limited by the shape or design of the light-blocking surface, numeral 2 in the drawings.

Figure 7:
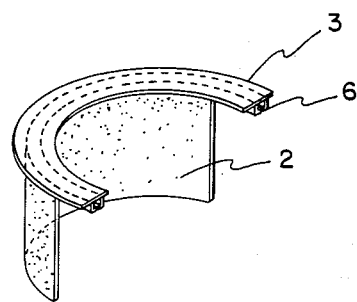
FIG. 7 is another embodiment of the invention showing a slidable light-shielding surface.

FIG. 7 represents another embodiment of the invention wherein the flange portion is a continuous flange in a semicircle extending around said axis from approximately 110° to the full 360°. The surface, numeral 2, is designed to removably slide into a groove, numeral 6, provided in the lower surface of said flange. Thus, the surface can be rotated around the dome light to direct light according to the needs of occupants of the vehicle. Thus, the connection of the surface to the flange may be fixed or removable.

As can be seen from a review of this specification, the primary object of this invention is the provision of a light-shielding dome light accessory adaptable for use in most any make or model of vehicle, which accessory allows night-time use of the dome light of a vehicle without interference by the light of the driver of the vehicle.

Having thus described my invention, I claim:

1. A removable automobile dome light accessory consisting essentially of a shape-sustaining material surface extending in a substantially vertical plane continuously around a dome light central axis substantially parallel to said plane so as to block out light emanating therefrom into the passenger area of an automobile, the outermost edges of said shape-sustaining material surface forming an angle of between 90 degrees and 180 degrees with said axis, and said surface having flange portions connected thereto and extending inwardly from the uppermost edges of said surface toward the said central axis, said flange portion slidably engaging the dome light of the automobile, wherein said surface extends downwardly in a substantially vertical plane from the upper edge of said surface a distance of at least approximately two inches, wherein said flange portions extend inwardly a sufficient distance to slide under a portion of the outer edge of a fixed automobile dome light, whereby said accessory is readily attachable to and removable from said automobile dome light, and is selectively adjustable to illuminate one passenger area while blocking light that would be generated towards other passenger areas of the automobile.

* * * * *